(12) United States Patent
Dejneka et al.

(10) Patent No.: US 8,232,218 B2
(45) Date of Patent: Jul. 31, 2012

(54) ION EXCHANGED, FAST COOLED GLASSES

(75) Inventors: Matthew John Dejneka, Corning, NY (US); Adam James Ellison, Painted Post, NY (US); Sinue Gomez, Corning, NY (US)

(73) Assignee: Corning Incorporated, Corning, NY (US)

( * ) Notice: Subject to any disclaimer, the term of this patent is extended or adjusted under 35 U.S.C. 154(b) by 587 days.

(21) Appl. No.: 12/393,241

(22) Filed: Feb. 26, 2009

(65) Prior Publication Data
US 2009/0220761 A1      Sep. 3, 2009

Related U.S. Application Data

(60) Provisional application No. 61/067,732, filed on Feb. 29, 2008.

(51) Int. Cl.
*C03C 3/083* (2006.01)
*C03C 3/085* (2006.01)
*C03C 3/087* (2006.01)
*C03C 23/00* (2006.01)
*B32B 17/00* (2006.01)

(52) U.S. Cl. ............. 501/68; 501/69; 501/70; 428/410; 65/30.1

(58) Field of Classification Search ............ 501/66, 501/68, 69, 70; 428/410; 65/30.1
See application file for complete search history.

(56) References Cited

U.S. PATENT DOCUMENTS

| 3,723,080 | A | 3/1973 | Howell et al. | |
|---|---|---|---|---|
| 3,751,238 | A | 8/1973 | Grego et al. | |
| 4,859,636 | A | 8/1989 | Aratani et al. | |
| 7,666,511 | B2 * | 2/2010 | Ellison et al. | 428/426 |
| 2004/0075086 | A1 | 4/2004 | Wolff et al. | |
| 2005/0250639 | A1 | 11/2005 | Siebers et al. | |
| 2006/0006786 | A1 * | 1/2006 | Fechner et al. | 313/493 |
| 2008/0020919 | A1 * | 1/2008 | Murata | 501/66 |
| 2008/0286548 | A1 | 11/2008 | Ellison et al. | |

OTHER PUBLICATIONS

Matthew J. Dejneka et al.; U.S. Appl. No. 12/392,577, filed Feb. 25, 2009 entitled "Fining Agents for Silicate Glasses".
"Standard Test Method for Measuring Optical Retardation and Analyzing Stress in Glass"; ASTM Int'l; Designation: F218-05; 7 Pages, Feb. 24, 2009.
N.L. Wu et al.; "Identificteion and Structural Characterization of CA(PtxCu(1-3))3O4"; Materials Research Bulletin, vol. 34, Nos. 14/15, pp. 2151-2157; 1999.

* cited by examiner

*Primary Examiner* — Karl Group
*Assistant Examiner* — Elizabeth A Bolden
(74) *Attorney, Agent, or Firm* — Robert P. Santandrea

(57) ABSTRACT

A glass that is ion exchangeable to a depth of at least 20 μm (microns) and has a internal region having a tension of less than or equal to 100 MPa. The glass is quenched or fast cooled from a first temperature above the anneal point of the glass to a second temperature that is below the strain point of the glass. In one embodiment, the glass is a silicate glass, such as an alkali silicate glass, an alkali aluminosilicate glass, an aluminosilicate glass, a borosilicate glass, an alkali aluminogermanate glass, an alkali germanate glass, an alkali gallogermanate glass, and combinations thereof.

18 Claims, 2 Drawing Sheets

ION EXCHANGED, FAST COOLED GLASSES

CROSS REFERENCE TO RELATED APPLICATIONS

This application claims the benefit of priority under 35 U.S.C. §119(e) of U.S. Provisional Application Ser. No. 61/067,732, filed on Feb. 29, 2008, the contents of which are incorporated by reference herein in their entirety.

BACKGROUND

The ability to strengthen glass sheets allows glass to be used in applications, such as cover plates for cellular phones and other mobile electronic applications, where everyday exposure and use require high strength and scratch resistance.

The induction of surface compressive stress profiles in glass is a well known approach for strengthening. Ion exchange, or chemical strengthening, of glass can be used to incorporate residual stresses in the glass. In the ion exchange process, a glass containing alkali metal ions is exposed to a molten salt bath that contains alkali metal ions which are larger than those ions that are initially in the glass. As a result of chemical potential differences, some alkali metal ions in the glass are replaced by the larger ions, thus creating a layer of larger volume. This larger volume layer leads to the development of compressive stress in the surface of the glass and, consequently, a compensating tensile stress in the interior of the glass to maintain the equilibrium of forces. Since glass only fails under tension, this compression layer strengthens the glass. If the internal tensile stress generated by the exchange layer is critically high, the glass may be frangible—i.e., the glass may suffer substantial fragmentation upon damage or spontaneous breakup. The thinner the glass, the higher the tensile stress developed for a given depth of layer.

Chemically strengthened soda-lime type glasses are commonly used as cover plates or windows mobile electronic devices such as mobile or cellular telephones, pagers, audio and video players, and games. Soda-lime glasses are difficult to chemically strengthen, and usually require long treatment times to achieve adequate strength by ion exchange. Soda-lime glass sheets are commercially fabricated via floatation in a tin bath, and these glasses cannot be formed by methods such as down-draw processes that are associated with the manufacture of precision sheet glass.

SUMMARY

A glass that is ion exchangeable to a depth of at least 20 µm (microns) and has a internal region having a central tension of less than or equal to 100 MPa is provided. The glass is quenched or fast cooled from a first temperature above the anneal point of the glass to a second temperature that is below the strain point of the glass. In one embodiment, the glass is a silicate glass, such as an alkali silicate glass, an alkali aluminosilicate glass, an aluminosilicate glass, a borosilicate glass, an alkali aluminogermanate glass, an alkali germanate glass, an alkali gallogermanate glass and combinations thereof.

Accordingly, one aspect of the disclosure is to provide a glass article. The glass article has an anneal point and a strain point, and is quenched from a first temperature that is greater than the anneal point of the glass article to a second temperature that is less than the strain point of the glass article. The glass article is ion exchangeable and, when ion exchanged, has an ion exchanged surface region having a depth of at least 20 µm.

A second aspect of the disclosure is to provide a silicate glass. The silicate glass has an ion exchanged surface region and an internal region, wherein the internal region has a central tension of less than about 100 MPa and the ion exchanged region has a depth of at least about 20 µm.

A third aspect of the disclosure is to provide a silicate glass article. The silicate glass article has an anneal point and a strain point, and is quenched from a first temperature that is greater than the anneal point to a second temperature that is less than the strain point. The silicate glass article is ion exchangeable and, when ion exchanged, has an ion exchanged surface region and an internal region. The ion exchanged region has a depth of at least 20 µm and the internal region has a central tension of less than about 100 MPa.

A fourth aspect of the disclosure is to provide a method of making a glass article. The glass article has an anneal point and a strain point, and an ion exchanged surface region having a depth of at least 20 µm. The method comprises the steps of: providing a glass article; heating the glass article up to a first temperature that is greater than the anneal point of the glass article; quenching the glass article from the first temperature to a second temperature that is less than the strain point of the glass article; and forming an ion exchanged surface layer having a depth of at least 20 µm in the glass article.

A fifth aspect of the disclosure is to provide a method of strengthening a glass article without inducing frangibility of the glass article. The method comprises the steps of: providing a glass article; heating the glass article to a first temperature above the anneal point of the glass, wherein heating the glass article above the anneal point increases the volume of the glass; quenching the glass article from the first temperature to a second temperature below the strain point of the glass article at a predetermined rate and exchanging a plurality of ions of a first element in the glass article with a plurality of ions second of a second element, wherein each of the plurality of ions of the second element has an ionic radius greater than that of each of the plurality of ions of the first element to create a surface compressive stress profile in the glass article and strengthen the article.

These and other aspects, advantages, and salient features will become apparent from the following detailed description, the accompanying drawings, and the appended claims.

DETAILED DESCRIPTION

Figure 1:
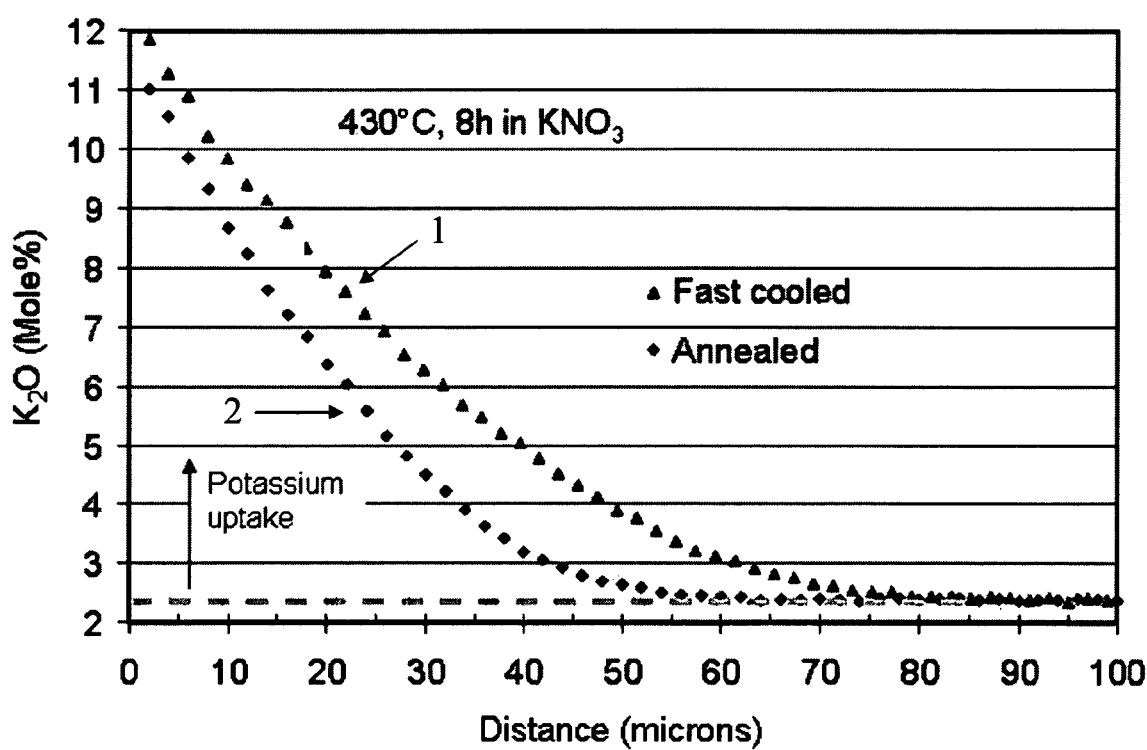
FIG. 1 is a plot of potassium diffusion profiles in quenched and annealed glasses.

In the following description, like reference characters designate like or corresponding parts throughout the several views shown in the figures. It is also understood that, unless otherwise specified, terms such as "top," "bottom," "outward," "inward," and the like are words of convenience and are not to be construed as limiting terms. In addition, whenever a group is described as comprising at least one of a group of elements and combinations thereof, it is understood that the group may comprise, consist essentially of, or consist of any number of those elements recited, either individually or in combination with each other. Similarly, whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the recited range.

Referring to the drawings in general and to FIG. 1 in particular, it will be understood that the illustrations are for the purpose of describing particular embodiments and are not intended to limit the invention thereto.

Chemically strengthened soda-lime type glasses are commonly used in cover plate applications. Soda-lime glass sheets are commercially fabricated via floatation in a tin bath, but cannot be formed by methods more traditionally associated with precision sheet glass, particularly fusion and downdraw processes. The ion exchangeability of conventional soda-lime glass is also limited, and long treatment times are required to obtain a sufficiently deep compression layer (>20 µm). Developing glasses that can be ion exchanged quickly to depths of layer >20 µm without causing critical tensile stress benefits certain applications such as, for example, portable electronic devices, where glasses may be subject to conditions that require exceptional toughness. A large depth of layer is desirable in such applications, since it imparts protection to the glass surface against flaws or damage. Nonetheless, if the internal tensile stress generated by the exchange layer is greater than a threshold value, the glass could suffer substantial fragmentation upon damage or spontaneous breakup. The thinner the sample, the higher the tensile stress that is developed for a given depth of layer.

The magnitude of internal stress is related not just to the profile of alkali metal ions after ion exchange, but also to the degree to which the glass relaxes during the ion exchange process. This relaxation is attributed to the glass freezing in arrangements of atoms when cooled from the melt that are not equivalent to the equilibrium state that would be adopted after extended periods at elevated temperature. When the glass is reheated or annealed, the re-equilibration process resumes, and atoms move into positions that better satisfy their bonding requirements. Glasses quenched rapidly from high temperature typically show a measurable and irreversible decrease in net volume upon reheating. Viewed in a simplistic mechanical way, compaction brings the surfaces of the sheet closer together.

What is desired is a glass that is capable of ion exchange—or is ion exchanged—to considerable depth and simultaneous contraction due to thermal re-equilibration. If this objective were realized, a glass that might otherwise develop excessive internal stress for a given ion exchange procedure might instead show acceptable stress, yet possess excellent toughness.

As used herein, "anneal point" refers to the temperature at which the viscosity of a material, such as a glass, is $10^{13.2}$ poise. As used herein, "strain point" refers to the temperature at which the viscosity of a material, such as a glass, is $10^{14.7}$ poise. As used herein, "fictive temperature" ($T_f$) refers to the temperature at which a glass formed by rapid cooling (also referred to herein as "quenching") is prevented from structurally reorganizing; i.e., the temperature at which the structure of the liquid and the glass are essentially the same.

As used herein, "quenching" (also referred herein to as "fast cooled") refers to the rapid cooling of a material from a first temperature to a second, lower, temperature at a rate exceeding a minimum rate of cooling. It is understood that either liquid (e.g., molten) or solid materials may be quenched.

As described herein, an ion exchangeable glass article is provided. When ion exchanged, the glass has an ion exchanged surface region (also referred to herein as a "depth of layer" or "DOL") having a depth of at least about 20 µm and an internal region having a central tension of less than about 100 MPa. In one embodiment, the central tension is less than about 70 MPa. The glass article is quenched from a first temperature, the first temperature being greater than the anneal point of the glass, to a second temperature that is less than the strain point of the glass. For most glasses, the strain point is typically 40-50° C. lower than the anneal point. In one embodiment, the glass is quenched from the first temperature to the second temperature at a rate of at least 4° C. per second (° C./s).

In one embodiment, the glass is a silicate glass. The silicate glass may be an alkali silicate glass, an alkali aluminosilicate glass, an aluminosilicate glass, a borosilicate glass, an alkali aluminogermanate glass, an alkali germanate glass, an alkali gallogermanate glass, or any combination thereof. The silicate glass, in one embodiment, comprises: 60-70 mol % $SiO_2$; 6-14 mol % $Al_2O_3$; 0-15 mol % $B_2O_3$; 0-15 mol % $Li_2O$; 0-20 mol % $Na_2O$; 0-10 mol % $K_2O$; 0-8 mol % $MgO$; 0-10 mol % $CaO$; 0-5 mol % $ZrO_2$; 0-1 mol % $SnO_2$; 0-1 mol % $CeO_2$; less than 50 ppm $As_2O_3$; and less than 50 ppm $Sb_2O_3$; wherein 12 mol % $\leq Li_2O+Na_2O+K_2O \leq 20$ mol % and 0 mol % $\leq MgO+CaO \leq 10$ mol %. In another embodiment, the silicate glass comprises: 63.5-66.5 mol % $SiO_2$; 8-12 mol % $Al_2O_3$; 0-3 mol % $B_2O_3$; 0-5 mol % $Li_2O$; 8-18 mol % $Na_2O$; 0-5 mol % $K_2O$; 1-7 mol % $MgO$; 0-2.5 mol % $CaO$; 0-3 mol % $ZrO_2$; 0.05-0.25 mol % $SnO_2$; 0.05-0.5 mol % $CeO_2$; less than 50 ppm $As_2O_3$; and less than 50 ppm $Sb_2O_3$; wherein 14 mol % $\leq Li_2O+Na_2O+K_2O \leq 18$ mol % and 2 mol % $\leq MgO+CaO \leq 7$ mol %.

The largest single constituent of the silicate glass is $SiO_2$, which forms the matrix of the glass and is present in the inventive glasses in a concentration ranging from about 60 mol % up to and including about 70 mol %. $SiO_2$ serves as a viscosity enhancer that aids formability and imparts chemical durability to the glass. At concentrations that are higher than the range given above, $SiO_2$ raises the melting temperature prohibitively. Glass durability suffers at concentrations below this range. In addition, $SiO_2$ concentrations that are less than the range described herein above can cause the liquidus temperature to increase substantially in glasses having high alkali or alkali earth metal oxide concentrations.

The greater alkali metal oxide (also referred to herein as "alkali oxide") content of the silicate glass facilitates melting, softens the glass, enables ion exchange, decreases melt resistivity, and breaks up the glass network which increases thermal expansion and decreases durability. Mixtures of alkali metal oxides help depress the liquidus temperature and may enhance ion exchange as well. While $Li_2O$ provides fast ion exchange, low density, and high modulus, it is also quite expensive. $Na_2O$ is very desirable for ion exchange with $K^+$ ions for chemical strengthening and makes stable glasses with respect to devitrification. Small amounts of $K_2O$ relative to $Na_2O$ actually help increase the rate of exchange of $K^+$ ions for $Na^+$ ions and decrease the liquidus temperature, but also increase the thermal expansivity of the glass.

Alumina ($Al_2O_3$) and, to a lesser extent, zirconia ($ZrO_2$) have the opposite effect of the alkali metal oxides. In addition, $Al_2O_3$ scavenges non-bridging oxygens (NBOs) to form $AlO_4$ tetrahedra while making the glass thermally harder. Alumina and zirconia also provide lower expansion and greater durability but, at high concentrations, make the glass more difficult to melt. In most ion exchangeable glasses, $R_2O > Al_2O_3$ (where $R_2O$ represents at least one alkali metal oxide, such as $Li_2O$, $Na_2O$, $K_2O$) since glasses in which $R_2O = Al_2O_3$ are very difficult to melt unless $B_2O_3$ is present.

Alkaline earth metal oxides (also referred to herein as "alkali earth oxides") help create a steeper viscosity curve for the glasses. Replacing alkali metal oxides with alkaline earth metal oxides generally raises the anneal and strain points of the glass while lowering the melting temperatures needed to make high quality glass. MgO and CaO are less expensive than SrO and BaO and do not increase the density as much as the heavier oxides. BaO is also considered to be a hazardous or toxic material, and its presence is therefore undesirable. Accordingly, in one embodiment, the glass is substantially free of barium. Large amounts of MgO tend to increase the liquidus temperature, as the oxide is prone to form forsterite ($Mg_2SiO_4$) at low MgO concentrations in sodium aluminosilicate glasses.

$B_2O_3$ may be used as a flux to soften glasses, making them easier to melt. $B_2O_3$ also helps scavenge non-bridging oxygen atoms (NBOs) converting the NBOs to bridging oxygen atoms through the formation of $BO_4$ tetrahedra, which increase the toughness of the glass by minimizing the number of weak NBOs. $B_2O_3$ also lowers the hardness of the glass which, when coupled with the higher toughness, decreases the brittleness, thereby resulting in a mechanically durable glass.

Chemical fining agents may also be added to the silicate glass to eliminate gaseous inclusions. Such fining agents fill early-stage bubbles with gas, thus increasing their rise velocity through the melt. Typical fining agents include, but are not limited to: oxides of arsenic, antimony, tin, and cerium; metal halides (fluorides, chlorides and bromides); metal sulfates; and the like. Alternatively, other fining agents, such as metal hydrates and hydroxides, may be used as fining agents. Such metal hydrates and hydroxides are described in U.S. Provisional patent application Ser. No. 12/392,577, entitled "Fining Agents for Silicate Glasses" by Matthew Dejneka et al., filed on Feb. 25, 2009, the contents of which are incorporated herein by reference in their entirety. In one embodiment, the silicate glass is substantially free of at least one of arsenic and antimony.

Whereas arsenic and antimony are particularly effective fining agents because they release oxygen very late in the melt stage, they are widely regarded as hazardous or toxic materials, and their presence is therefore undesirable. Accordingly, the silicate glass, in another embodiment, is substantially free of at least one of arsenic, antimony, and barium.

In one embodiment, the silicate glass has a liquidus viscosity of at least 100 kilopoise (kpoise). In another embodiment, the liquidus viscosity is at least 160 kpoise, and, in a third embodiment, the liquidus viscosity is at least 220 kpoise. As used herein, the term "liquidus viscosity" refers to the viscosity of a molten glass at the liquidus temperature, wherein the liquidus temperature refers to the temperature at which the very last crystals melt away as temperature is increased from room temperature. These properties permit these silicate glasses to be down-drawable; i.e., the glass is capable of being formed into sheets using down-draw methods such as, but not limited to, fusion draw and slot draw methods that are known to those skilled in the art. Such down-draw processes are used in the large-scale manufacture of ion exchangeable flat glass.

Down-draw processes cool the melt at particularly high rates, generating glasses with high fictive temperatures ($T_f$). The fictive temperature of a glass represents the temperature at which a glass formed by rapid cooling is prevented from structural reorganization such that the structure of the glass and the liquid are approximately the same. The physical properties of glasses generally vary with their cooling rate and phenomenon associated with acquiring different $T_f$. Glasses with higher $T_f$ thus exhibit lower density, lower hardness, and lower elastic modulus.

The fusion draw process uses a drawing tank that has a channel for accepting molten glass raw material. The channel has weirs that are open at the top along the length of the channel on both sides of the channel. When the channel fills with molten material, the molten glass overflows the weirs. Due to gravity, the molten glass flows down the outside surfaces of the drawing tank. These outside surfaces extend down and inwardly so that they join at an edge below the drawing tank. The two flowing glass surfaces join at this edge to fuse and form a single flowing sheet. The fusion draw method offers the advantage that, since the two glass films flowing over the channel fuse together, neither outside surface of the resulting glass sheet comes in contact with any part of the apparatus. Thus, the surface properties of the glass sheet are not affected by such contact.

The slot draw method is distinct from the fusion draw method. Here the molten raw material glass is provided to a drawing tank. The bottom of the drawing tank has an open slot with a nozzle that extends the length of the slot. The molten glass flows through the slot/nozzle and is drawn downward as a continuous sheet therethrough and into an annealing region. Compared to the fusion draw process, the slot draw process provides a thinner sheet, as only a single sheet is drawn through the slot, rather than two sheets being fused together, as in the fusion down-draw process.

Down-draw processes produce surfaces that are relatively pristine. Because the strength of the glass surface is controlled by the amount and size of surface flaws, a pristine surface that has had minimal contact has a higher initial strength. When this high strength glass is then chemically strengthened, the resultant strength is higher than that of a surface that has been a lapped and polished. Chemical strengthening or tempering by ion exchange also increases the resistance of the glass to flaw formation due to handling. Down-drawn glass may be drawn to a thickness of less than about 2 mm. In addition, down drawn glass has a very flat, smooth surface that can be used in its final application without costly grinding and polishing.

Silicate glasses made by the fusion draw and slot draw processes are very rapidly quenched from a viscous liquid to solid glass. The rate of cooling depends on the thickness of the sheet, its thermal diffusivity, the temperature of the surroundings, and the rate at which the silicate glass is cooled once exposed to air. The rate of cooling may in turn be affected by placing heating or cooling elements near the glass as it descends from the slot or isopipe. However, a relatively high fictive temperature is inherent to down-draw processes, since the glass must be able to support its own weight as soon as it leaves the forming device. In contrast to down-draw processes, the float process, in which the glass is supported on molten metal, produces appreciable annealing of the glass due to the elevated temperature of the float bath and the extended period of time that the glass remains in contact with the bath.

In one embodiment, the glass described herein is substantially free of lithium. As used herein, "substantially free of lithium" means that lithium is not intentionally added to the glass or glass raw materials during any of the processing steps leading to the formation of the alkali aluminosilicate glass. It is understood that a glass or a glass article that is substantially free of lithium may inadvertently contain small amounts of lithium due to contamination. The absence of lithium reduces poisoning of ion exchange baths, and thus reduces the need to replenish the salt supply needed to chemically strengthen the glass. In addition, due to the absence of lithium, the glass is compatible with continuous unit (CU) melting technologies such as the down-draw processes described above and the materials used therein, the latter including both fused zirconia and alumina refractories and zirconia and alumina isopipes.

As described hereinabove, the glass is ion exchangeable. As used herein, the term "ion exchangeable" is understood to mean that the glass is capable of being strengthened by ion exchange processes that are known to those skilled in the art. Such ion exchange processes include, but are not limited to, treating the glass with a heated solution containing ions having a larger ionic radius than that of the ions that are present in the glass surface, thus replacing the smaller ions with the larger ions. Potassium ions, for example, may replace sodium ions in the glass. Alternatively, other alkali metal ions having larger atomic radii, such as rubidium or cesium, could replace smaller alkali metal ions in the glass. In another embodiment, the smaller alkali metal ions could be replaced by $Ag^+$ ions. In one embodiment, the down-drawn glass is chemically strengthened by placing it a molten salt bath comprising $KNO_3$ for a predetermined time period to achieve ion exchange. In one embodiment, the temperature of the molten salt bath is about 430° C. and the predetermined time period is about eight hours. Similarly, other alkali metal salts such as, but not limited to, sulfates, halides, and the like may be used in the ion exchange process.

Surface compressive stress refers to a stress caused by the substitution during chemical strengthening of an alkali metal ion contained in a glass surface layer by another alkali metal ion having a larger ionic radius. In one embodiment, potassium ions are substituted for sodium ions in the surface layer of the glass described herein. The glass has a surface compressive stress of at least about 200 MPa. In one embodiment, the surface compressive stress is at least about 600 MPa. The glass has a compressive stress layer that has a depth of at least about 20 μm.

The replacement of smaller ions by larger ions at a temperature below that at which the glass network can relax produces a distribution of ions across the surface of the glass that results in a stress profile. The larger volume of the incoming ion produces compressive stress (CS) on the surface and tension in the center (central tension CT) of the glass. The compressive stress is related to the central tension by the following relationship:

$$CS=CT\times(t-2DOL)/DOL;$$

where t is the thickness of the glass and DOL is the depth of exchange, also referred to as depth of layer. When ion exchanged, the glass described herein has a central tension of less than about 100 MPa and, in one embodiment, less than about 70 MPa.

When down-drawn into a glass sheet, the glass article may have a thickness in a range from about 0.1 mm up to about 3 mm. In one embodiment, the thickness of the glass sheet is in a range from about 0.1 mm up to about 1.0 mm. in another embodiment, the glass sheet has a thickness in a range from about 10. mm up to about 0.5 mm. The glass sheet is resistant to both chipping and scratching, making it well suited for use as a cover plate—i.e., a display window or the like—for mobile electronic devices such as, but not limited to, mobile or cellular telephones, pagers, audio and video players, games, and other applications that require strong and tough glass with good scratch resistance.

A method of making the glasses described herein is also provided. A glass article is first provided. The glass may, in one embodiment, be a silicate glass, such as, but not limited to, an alkali silicate glass, an alkali aluminosilicate glass article, an aluminosilicate glass article, a borosilicate glass article, an alkali aluminogermanate glass article, an alkali germanate glass article, an alkali gallogermanate glass article, and combinations thereof, as previously described herein. In one embodiment, the step of providing the glass article includes providing batch raw materials for the glass and heating these materials to provide a melt of the glass. The glass is then heated to a first temperature that is greater than the anneal point of the glass. In those embodiments where a melt of the glass is provided, the melt is already at a temperature above the anneal point. In those embodiments where a solid glass article rather than a melt is provided, the glass is typically heated to a temperature at which the glass has a viscosity that is $10^{11}$ poise or less. The glass is then quenched from the first temperature to a second temperature, which less than the strain point of the glass. The glass is quenched at a rate of at least 4° C./s. In one embodiment, the glass is quenched by down-drawing the glass melt using, for example, slot-draw or fusion-draw processes as described hereinabove.

In another embodiment, a solid glass article, instead of a melt, is first provided. The glass article is heated to a first temperature that is greater than the anneal point, typically to a temperature at which the viscosity of the glass is $10^{11}$ poise or less, and quenched to a second temperature that is less than the strain point of the glass. This may be accomplished by cooling the glass article with forced air or other mixtures (e.g., nitrogen or helium) gases. These gases may be chilled in order to increase the quench rate.

Following the quenching step, an ion exchanged surface layer having a depth of at least 20 μm is formed in the glass. The ion exchanged layer may be formed by exchanging larger alkali metal ions for smaller alkali metal ions. Ion exchange may be carried out using those methods known in the art and described herein. In one embodiment, the glass is immersed in a molten salt bath comprising an alkali metal salt such as, for example, $KNO_3$, for a predetermined time period to achieve ion exchange. The glass has a central tension of less than about 100 MPa and, in one embodiment, less than about 100 MPa and, in one embodiment, less than about 70 MPa.

A method of strengthening a glass article is also provided. The method strengthens the glass without inducing frangibility in the glass article. A glass article is first provided. The glass may, in one embodiment, be a silicate glass, such as, but not limited to, an aluminosilicate glass, a borosilicate glass, and combinations thereof, as previously described herein. In one embodiment, the step of providing the glass article includes providing the raw materials for the glass and heating these materials to form a melt of the glass. In another embodiment, a solid glass article, instead of a melt, is provided.

The glass article is heated to a first temperature that is greater than the anneal point of the glass to increase the volume of the glass, and then quenched to a second temperature that is less than the strain point of the glass. The glass is quenched at a rate of at least 4° C./s. In one embodiment where the glass article is molten, the melt is heated to a temperature that is greater than the anneal point and quenched by down-drawing the glass using, for example, slot-draw or fusion-draw processes as described hereinabove, to form a sheet. In another embodiment, a solid glass article is heated to a temperature above the anneal point of the glass and then quenched to a temperature below the strain point of the glass.

In one embodiment, a surface compressive stress profile is then created in the glass article by subjecting the glass article to an ion exchange process. In this process, a plurality of ions of a first element in a surface region in the glass article are exchanged with a plurality of ions of a second element, wherein each of the ions of the second element has an ionic radius that is greater than that of the ion of the first element that is being replaced. In one embodiment, the first and second elements are alkali metals. In another embodiment, the first and second elements are alkali metals other than lithium. The replacement of Na$^+$ ions with K$^+$ ions is a non-limiting example of such an ion exchange. Ion exchange may be carried out using those methods known in the art and described herein. In one embodiment, the glass is immersed in a molten salt bath comprising an alkali metal salt such as, for example, KNO$_3$, for a predetermined time period to achieve ion exchange. An ion exchanged surface layer having a depth of at least 20 μm is formed in the glass, and the glass has a central tension of less than about 100 MPa and, in one embodiment, less than about 70 MPa.

EXAMPLE

The following example illustrates the features and advantages of the glasses and methods described herein, and is in no way intended to limit the invention thereto.

Table 1 lists compositions of alkali aluminosilicate glasses and their annealing and softening points. Samples of these glasses were heated to a temperature ("heating temperature" in Table 1) above their respective anneal points and either quenched ("fast-cooled" in Table 1) from that temperature or annealed ("annealed" in Table 1). Glasses 1-4 and 7 were then ion exchanged by immersion in a potassium nitrate (KNO$_3$) bath at 410° C. for eight hours. Glasses 5 and 6 were ion exchanged by immersion in a KNO$_3$ bath at 430° C. for eight hours.

through the thickness of the glass to measure the stress and depth of layer (DOL). DOL is determined using a polarized microscope equipped with a micrometer to measure the position of the fringes to the point of zero stress with respect to the edge of the glass sample.

Potassium diffusion profiles in glasses that had been either fast cooled (quenched) (curve 1 in FIG. 1) or annealed (curve 2 in FIG. 1) are shown in FIG. 1. The diffusion profiles were measured using electron microprobe analysis. Both glasses had undergone ion exchange in a KNO$_3$ bath at 430° C. for eight hours. As seen in FIG. 1, the potassium diffusion in the fast cooled glass is faster than that measured in the annealed glass. In addition, potassium penetrates deeper through the surface of the quenched glass than through the surface of the annealed glass.

Figure 2:
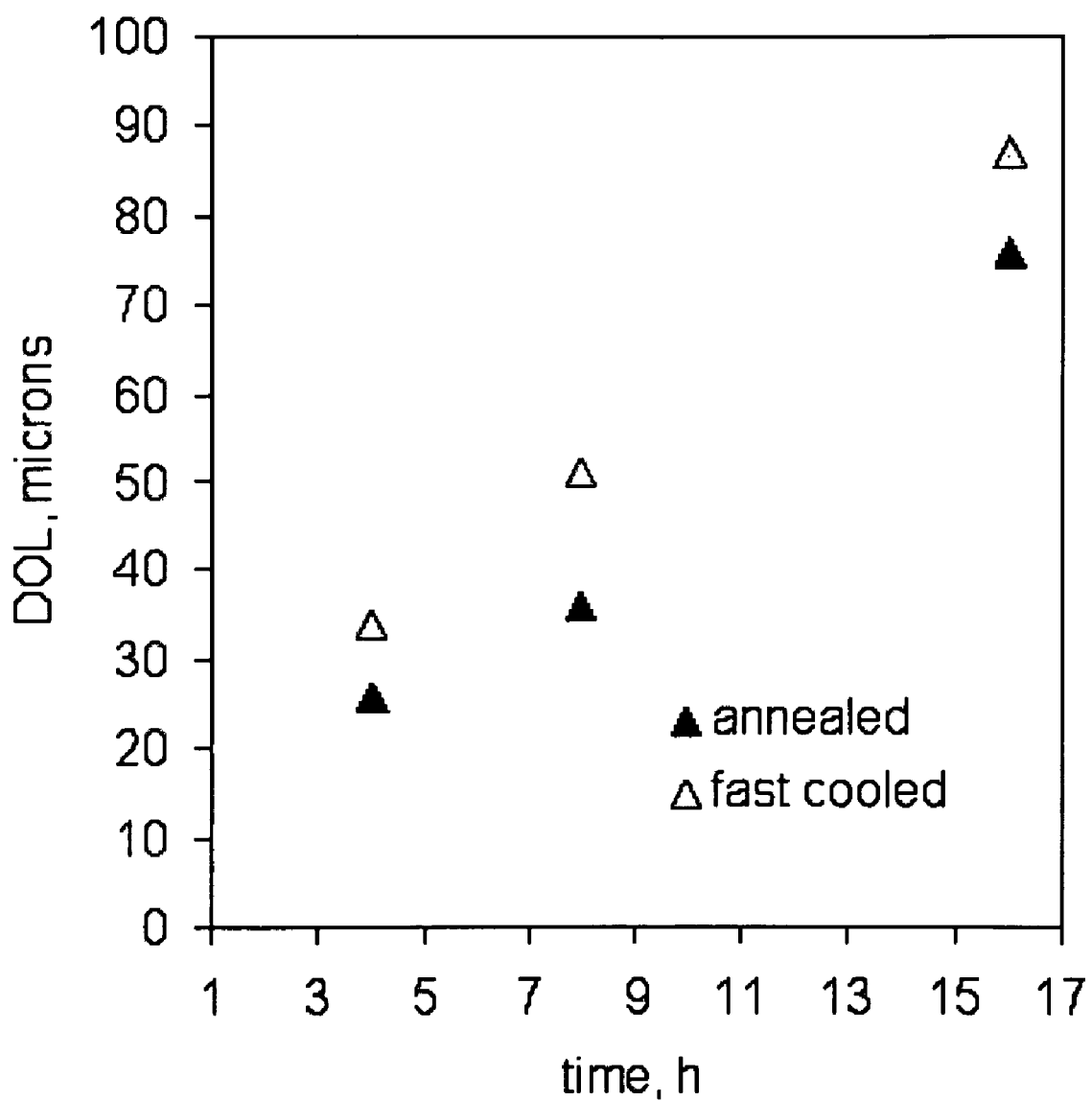
FIG. 2 is a plot of depth of layer for ion exchanged glasses and annealed glasses as a function of time allowed for ion exchange.

Differences in DOL between annealed and quenched glasses can be seen in FIG. 2 and in Table 2. FIG. 2 is a plot of depth of layer for ion exchanged glasses that had been quenched (solid triangles in FIG. 2) or annealed (open triangles in FIG. 2) (i.e., glasses that had not been heated to above the anneal point and quenched) as a function of time allowed for ion exchange. The quenched glass has a higher fictive temperature $T_f$ than the annealed glass, and can thus be ion exchanged under a given set of conditions to depths of layer that are 20-40% greater than the those achievable in the equivalent annealed glass. The less dense structure of the quenched glasses having higher $T_f$ allows them to undergo ion

TABLE 1

Compositions of ion exchanged glasses.

| Composition | mol % | 1 | 2 | 3 | 4 | 5 | 6 | 7 |
|---|---|---|---|---|---|---|---|---|
| | SiO$_2$ | 65.88 | 64.16 | 64.16 | 64.46 | 64.98 | 65.2 | 64.16 |
| | Al$_2$O$_3$ | 10.27 | 8.9 | 9.4 | 9.9 | 10.16 | 11.1 | 10.9 |
| | B$_2$O$_3$ | 0.63 | 1 | 2 | 1.12 | 6.18 | 6.2 | 1.23 |
| | Li$_2$O | | 0 | 0 | 0 | 2.36 | 2.3 | 0 |
| | Na$_2$O | 13.91 | 13.41 | 14.41 | 13.41 | 9.69 | 9.8 | 13.41 |
| | K$_2$O | 2.45 | 4.33 | 3.33 | 4.33 | 2.67 | 2.7 | 4.33 |
| | MgO | 5.86 | 3.72 | 2.22 | 4.57 | 1.8 | 2.2 | 5.02 |
| | CaO | 0.57 | 1.62 | 0.62 | 0.94 | 0.78 | 0.32 | 0.35 |
| | ZrO$_2$ | 0.4 | 2 | 3 | 1 | 0.97 | 0 | |
| | SnO$_2$ | 0 | 0.3 | 0.08 | 0.08 | 0.08 | 0.08 | |
| | CeO$_2$ | | | 0.1 | 0.1 | 0.1 | 0.1 | |
| Properties | annealing point | 608 | 593 | 601 | 589 | 537 | 536 | 600 |
| | softening point | 843 | 815 | 822 | 809 | 739 | 740 | 829 |
| | heating temperature | 667 | 680 | 669 | 658 | 599 | 599 | 643 |
| DOL, microns | fast-cooled | 50 | 59 | 60 | 56 | 43 | 48 | 56 |
| | annealed | 42 | 38 | 42 | 43 | 33 | 34 | 43 |

For each glass composition, the depth of the ion exchanged layer, expressed in μm, ("DOL" in Table 1) of the sample that had been quenched was greater than that of the annealed sample.

Annealed glasses were treated at temperatures about 20° C. above their anneal point for two hours and were then allowed to cool slowly to room temperature. To mimic the thermal history of the down-draw process, other samples of these glasses were given a fast cool treatment that included heating the glass at the $10^{11}$ poise temperature for one hour, and then quenching the glass at a rate of 4° C./s. Annealed and fast-cooled glass bars of dimensions 40 mm×5 mm×1 mm were exposed to molten KNO$_3$ at temperatures approximately 120° C. below the strain point of the glass for a period of at least two hours. The tensile stress resulting from the ion exchange treatment is measured photoelastically using a Friedel polarimeter. The sample is viewed along the long (40 mm) side exchange at a faster rate and attain a deeper depth of layer with lower tensile stress than equivalent annealed glass compositions.

Ion exchange parameters (molten salt bath temperature, ion exchange time, and depth of layer) and central tension for equivalent annealed and quenched (denoted by "-F" for each composition) glasses are listed in Table 2. Fast cooled glasses require less ion exchange time to achieve the same DOL as the equivalent annealed glass. For example, a 50 μm depth of layer is achieved in glass A-F in half the time needed to achieve the same DOL in the annealed glass A. Fast cooled glasses also result in a lower central tension of the glass. Lower central tension is advantageous, since it allows the compressive layer to increase in order to add extra protection to the glass surface before reaching critical values of tension.

TABLE 2

Ion exchange parameters and central tension for equivalent annealed and quenched glasses. Quenched glasses are denoted by "-F" for each composition.

| Glass | Temperature, °C. | time, h | DOL, um | ct, MPa |
|---|---|---|---|---|
| A | 430 | 8 | 50 | 31 |
| A-F* | 430 | 4 | 50 | 27 |
| B | 410 | 8 | 43 | 39 |
| B-F | 410 | 4 | 45 | 33 |
| C | 410 | 10 | 53 | 48 |
| C-F | 410 | 8 | 56 | 44 |
| D | 430 | 4 | 47 | 30 |
| D-F | 430 | 4 | 72 | 33 |
| E | 430 | 8 | 28 | 22 |
| E-F | 430 | 8 | 35 | 22 |
| F | 410 | 8 | 42 | 39 |
| F-F | 410 | 8 | 60 | 44 |

The exciting and unexpected discovery detailed here is that the differences in fictive temperature between as-drawn and annealed glasses are sufficient to produce a sizeable increase in depth of layer with no net increase in central tension, when compared to an annealed glass subjected to ion exchange for the same duration.

While typical embodiments have been set forth for the purpose of illustration, the foregoing description should not be deemed to be a limitation on the scope of the disclosure. Accordingly, various modifications, adaptations, and alternatives may occur to one skilled in the art without departing from the spirit and scope of the present disclosure.

The invention claimed is:

1. A glass article, the glass article having an anneal point and a strain point, wherein the glass article is quenched from a first temperature that is greater than the anneal point of the glass article to a second temperature, wherein the second temperature is less than the strain point of the glass article, the glass article comprising: 60-70 mol % $SiO_2$; 6-14 mol % $Al_2O_3$; 0-15 mol % $B_2O_3$; 0-2.5 mol % $Li_2O$; 0-20 mol % $Na_2O$; 0-10 mol % $K_2O$; 0-8 mol % MgO; 0-10 mol % CaO; 0-5 mol % $ZrO_2$; 0-1 mol % $SnO_2$; and 0-1 mol % $CeO_2$, wherein 12 mol % $\leq Li_2O+Na_2O+K_2O \leq 20$ mol % and 0 mol % $\leq$ MgO+CaO $\leq 10$ mol %, wherein the glass article is substantially free of antimony, barium, and arsenic, and wherein the glass article is ion exchangeable.

2. The glass article according to claim 1, wherein the glass article is ion exchanged and has a central tension of less than about 100 MPa.

3. The glass according to claim 1, wherein the glass article is quenched from the first temperature to the second temperature at a rate of at least 4° C./s.

4. The glass article according to claim 1, wherein the glass is substantially free of lithium.

5. The glass article according to claim 1, wherein the glass article is a glass sheet having a thickness ranging from about 0.1 mm up to about 3 mm.

6. The glass article according to claim 1, wherein the glass article is a sheet that is down-drawn.

7. The glass article according to claim 1, wherein the glass article is a cover plate for a portable electronic device.

8. The glass article according to claim 1, wherein the glass article is ion exchanged.

9. The glass article according to claim 8, wherein the ion exchanged surface region has a surface compressive stress of at least about 200 MPa.

10. A method of making a silicate glass article, the glass article having an anneal point and a strain point, wherein the glass article has an ion exchanged surface region having a depth of at least 20 μm, the method comprising the steps of:

a. providing a glass article, the glass article comprising: 60-70 mol % $SiO_2$; 6-14 mol % $Al_2O_3$; 0-15 mol % $B_2O_3$; 0-2.5 mol % $Li_2O$; 0-20 mol % $Na_2O$; 0-10 mol % $K_2O$; 0-8 mol % MgO; 0-10 mol % CaO; 0-5 mol % $ZrO_2$; 0-1 mol % $SnO_2$; and 0-1 mol % $CeO_2$, wherein 12 mol % $\leq Li_2O+Na_2O+K_2O \leq 20$ mol % and 0 mol % $\leq$ MgO+CaO $\leq 10$ mol %, wherein the glass article is substantially free of antimony, barium, and arsenic;

b. heating the glass article up to a first temperature that is greater than the anneal point of the glass article;

c. quenching the glass article from the first temperature to a second temperature, wherein the second temperature is less than the strain point of the glass article; and d. forming an ion exchanged surface layer having a depth of at least 20 μm in the glass article.

11. The method according to claim 10, wherein the step of quenching the glass article from the first temperature to the second temperature comprises quenching the glass article at a rate of at least 4° C./s from the first temperature to a second temperature.

12. The method according to claim 10, wherein the step of providing a glass article comprises providing a glass melt.

13. The method according to claim 12, wherein the step of quenching the glass article from the first temperature to the second temperature comprises down-drawing the glass melt to form a sheet of glass.

14. The method according to claim 10, wherein the silicate glass is one of an alkali silicate glass, an alkali aluminosilicate glass, an aluminosilicate glass, a borosilicate glass, an alkali aluminogermanate glass, an alkali germanate glass, an alkali gallogermanate glass, and combinations thereof.

15. A method of strengthening a alkali silicate glass without inducing frangibility of the glass article, the method comprising the steps of:

a. providing a glass article, wherein the glass article has an anneal point and a strain point and comprising: 60-70 mol % $SiO_2$; 6-14 mol % $Al_2O_3$; 0-15 mol % $B_2O_3$; 0-2.5 mol % $Li_2O$; 0-20 mol % $Na_2O$; 0-10 mol % $K_2O$; 0-8 mol % MgO; 0-10 mol % CaO; 0-5 mol % $ZrO_2$; 0-1 mol % $SnO_2$; and 0-1 mol % $CeO_2$, wherein 12 mol % $\leq Li_2O+Na_2O+K_2O \leq 20$ mol % and 0 mol % MgO+CaO $\leq 10$ mol %, wherein the glass article is substantially free of antimony, barium, and arsenic;

b. heating the glass article to a first temperature above the anneal point of the glass, wherein heating the glass article above the anneal point increases the volume of the glass;

c. quenching the glass article from the first temperature to a second temperature below the strain point of the glass article at a predetermined rate and d. exchanging a plurality of ions of a first alkali metal in the glass article with a plurality of ions second of a second alkali metal, wherein each of the plurality of ions of the second alkali metal has an ionic radius greater than that of each of the plurality of ions of the first alkali metal to create a surface compressive stress profile in the glass article.

16. The method according to claim 11, wherein the first alkali metal and the second alkali metal are alkali metals other than lithium ions.

17. The method according to claim 15, wherein the glass article is quenched from the first temperature to the second temperature at a rate of at least 4° C./s.

18. The glass article according to claim 9, has an ion exchanged surface region having a depth of at least 20 μm.

* * * * *